US011260836B2

(12) United States Patent
Todeschini et al.

(10) Patent No.: US 11,260,836 B2
(45) Date of Patent: Mar. 1, 2022

(54) ADAPTIVE BRAKE ASSIST SYSTEM FOR A CYCLIST ON A BICYCLE BY AN HAPTIC FEEDBACK

(71) Applicant: Blubrake S.r.l., Milan (IT)

(72) Inventors: Fabio Todeschini, Lecco (IT); Alessio Nicolò Cota, San Giuliano Milanese (IT); Luca Speziali, Caiolo (IT); Andrea Verzaglia, Mozzate (IT)

(73) Assignee: BLUBRAKE S.R.L., Milan (IT)

( * ) Notice: Subject to any disclaimer, the term of this patent is extended or adjusted under 35 U.S.C. 154(b) by 119 days.

(21) Appl. No.: 16/766,785

(22) PCT Filed: Nov. 8, 2018

(86) PCT No.: PCT/IB2018/058767
§ 371 (c)(1),
(2) Date: May 26, 2020

(87) PCT Pub. No.: WO2019/102290
PCT Pub. Date: May 31, 2019

(65) Prior Publication Data
US 2020/0298809 A1    Sep. 24, 2020

(30) Foreign Application Priority Data

Nov. 27, 2017  (IT) .................. 102017000135958

(51) Int. Cl.
*B60T 8/17*  (2006.01)
*B60T 8/1755*  (2006.01)
(Continued)

(52) U.S. Cl.
CPC ........ *B60T 8/1706* (2013.01); *B60T 8/17551* (2013.01); *B60T 8/241* (2013.01);
(Continued)

(58) Field of Classification Search
CPC .... B60T 8/1706; B60T 8/17551; B60T 8/241; B60T 8/3225; B62K 23/02; B62L 3/02
(Continued)

(56) References Cited

U.S. PATENT DOCUMENTS

2009/0091432 A1    4/2009  Kower et al.
2016/0221627 A1*   8/2016  Hines ................... B62H 5/20

FOREIGN PATENT DOCUMENTS

CN    105711701 A    6/2016
WO    2016115053 A1  7/2016
(Continued)

OTHER PUBLICATIONS

International Search Report & Written Opinion in PCT/IB2018/058767 dated Apr. 9, 2019.

*Primary Examiner* — Isaac G Smith
(74) *Attorney, Agent, or Firm* — Manelli Selter PLLC; Edward Stemberger (57) ABSTRACT

Adaptive brake assist system a cyclist on a bicycle by an aptic feedback, includes a first sensor (for measuring the angular speed ($\omega_1$) of a first wheel of the bicycle, adapted to generate a signal representative of the angular speed of the first wheel; an actuator mountable to a portion of the bicycle, adapted to generate vibrations; a control module configured to generate a command signal of the actuator, so that the actuator vibrates at a vibration frequency (f), based on at least the signal representative of the angular speed of the first wheel ($\omega_1$) and based on one or more reference magnitudes ($\eta_{ref}$); and a learning module configured to determine, updating and delivering to the control module the one or more reference magnitudes ($\eta_{ref}$) based on at least the signal representative of the angular speed ($\omega_1$) of the first wheel.

14 Claims, 5 Drawing Sheets

(51) Int. Cl.
  *B60T 8/24* (2006.01)
  *B60T 8/32* (2006.01)
  *B62K 23/02* (2006.01)
  *B62L 3/02* (2006.01)

(52) U.S. Cl.
  CPC ............ *B60T 8/3225* (2013.01); *B62K 23/02* (2013.01); *B62L 3/02* (2013.01); *B60T 2201/03* (2013.01); *B60T 2201/04* (2013.01)

(58) Field of Classification Search
  USPC .......................................................... 701/70
  See application file for complete search history.

(56) References Cited

FOREIGN PATENT DOCUMENTS

| WO | 2016203331 A1 | 12/2016 | |
|---|---|---|---|
| WO | WO-2016203331 A * | 12/2016 | ............. B60T 8/176 |
| WO | 2017134500 A1 | 8/2017 | |

* cited by examiner

ADAPTIVE BRAKE ASSIST SYSTEM FOR A CYCLIST ON A BICYCLE BY AN HAPTIC FEEDBACK

TECHNICAL FIELD OF THE INVENTION

The present invention refers to a brake assist system for a cyclist on a bicycle by an haptic feedback, particularly a system adapted to aid the cyclist to prevent a braking wheel from excessively slipping (consequently from loosing the lateral stability), or from possibly flipping over the bicycle, due to too high decelerations. The system according to the invention is configured to adapt to the ability of a cyclist.

PRIOR ART

Braking a bicycle, especially the front wheel thereof, is an action requiring a cyclist to have a determined sensibility and if he/she does not correctly brake, risks and problems can rise. For example, with reference to racing bicycles provided with narrow wheels and tires, an improperly modulated braking, particularly a too intense braking, can cause dangerous slippages which can cause falls. On the contrary, bicycles provided with large wheels and tires, such as mountain bikes, slipping is less risky, however on the other side the same large tire, in case of a too intense braking of the front wheel, can cause the bicycle itself to flip over around this wheel.

The Applicant, in order to overcome this problem, filed the international patent application WO 2016/203331, regarding a brake assist system for a cyclist on a bicycle by an haptic feedback, wherein an actuator is vibrated at a determined frequency if slippage conditions and/or a risk of flipping over the front wheel are determined. The operation of such system is based on the comparison between the effective motion conditions detected by bicycle sensors and preset reference conditions, manually selectable by the cyclist among a plurality of predefined options. The vibration of the actuator is managed as a function of such comparison.

However, such system has the inconvenience of not being sufficiently adaptable because is based on preset reference conditions which do not necessarily correspond to the real driving skillfulness of a cyclist.

BRIEF SUMMARY OF THE INVENTION

Therefore, an object of the present invention is that of providing a brake assist system for a cyclist on a bicycle by an haptic feedback capable of adapting to the driving skillfulness of each specific cyclist.

This and other objects are obtained by an adaptive brake assist system for a cyclist on a bicycle by an haptic feedback according to claim 1.

The dependent claims define possible advantageous embodiments of the invention.

BRIEF DESCRIPTION OF THE DRAWINGS

In order to gain a better comprehension of the invention and appreciate the advantages thereof, some illustrative non-limiting embodiments thereof will be described in the following with reference to the attached figures, wherein.

DESCRIPTION OF EMBODIMENTS OF THE INVENTION

Figure 1:
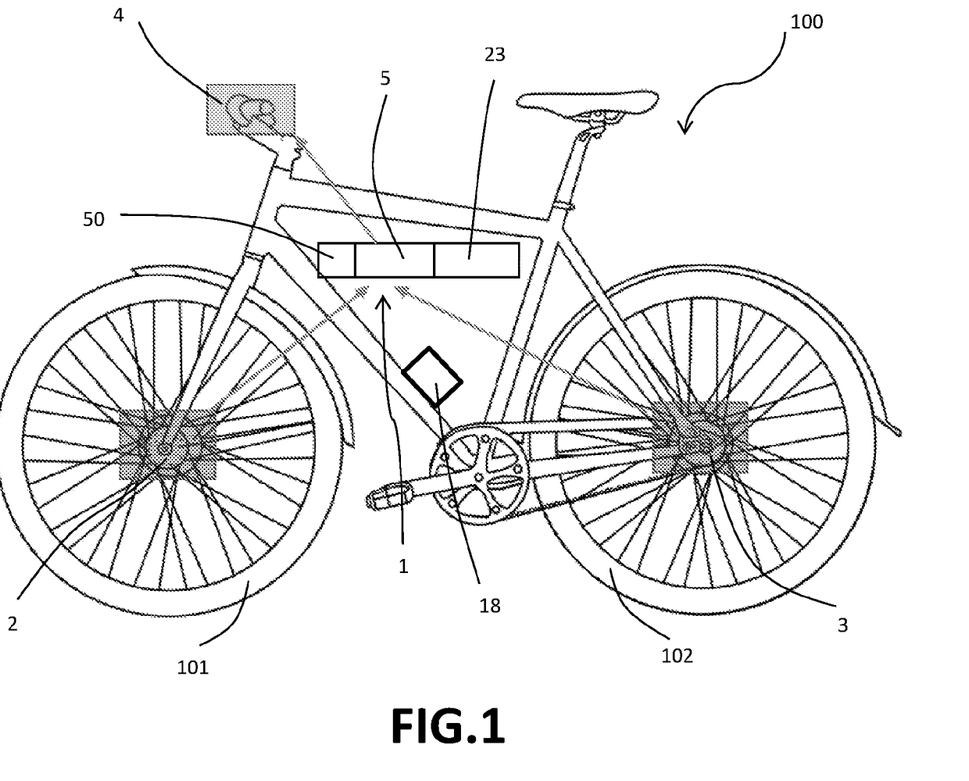
FIG. 1 is a schematic illustration of a bicycle provided with a brake assist system according to a possible embodiment of the invention.

With reference to FIG. 1, reference 100 generally indicates a bicycle. The bicycle 100 comprises a first 101 and second wheels 102, for example corresponding to the front wheel and rear wheel. A brake is associated to at least the first wheel 101, the brake being actuatable by a knob located on the handlebar, for example. The braking system can be of any known type, for example a pad or disk brake, commanded by a mechanical system, for example a cable or hydraulic system.

The bicycle 100 comprises a brake assist system 1 for a cyclist of the bicycle itself. As it will be explained, the system 1 does not actively control the braking, on the contrary it communicates, by a vibrating haptic feedback, to the cyclist the emergence of possibly dangerous events, particularly the slippage or a possible slippage of the first wheel 101, or the initial flipping-over of the bicycle around the same due to a braking. The slippage events are typical of bicycles having narrow wheels and tires, for example racing bicycles, while the flipping-over is typical of bicycles having large wheels and tires, for example mountain bikes. However, the basic principle of the system is the same and consists of correcting the slippage for preventing the flipping-over, according to the type of a considered bicycle, in other words to provide a vibrating haptic feedback advising the cyclist about a dangerous condition.

For this purpose, the system 1 comprises an actuator 4 adapted to generate vibrations. For example, the actuator 4 can comprise an eccentric mass such to generate vibrations when is rotated. The actuator 4 can be mounted to a portion of the bicycle so that, when the actuator vibrates, the vibrations can be perceived by the cyclist. Preferably, the actuator 4 is mounted to the brake lever of the first wheel 101, which is the wheel subjected to a slippage or around which a flipping-over caused by an excessively intense brake can occur. Therefore, the vibrating feedback is transferred to the lever on which the cyclist must act for modulating the braking.

Figure 2A:
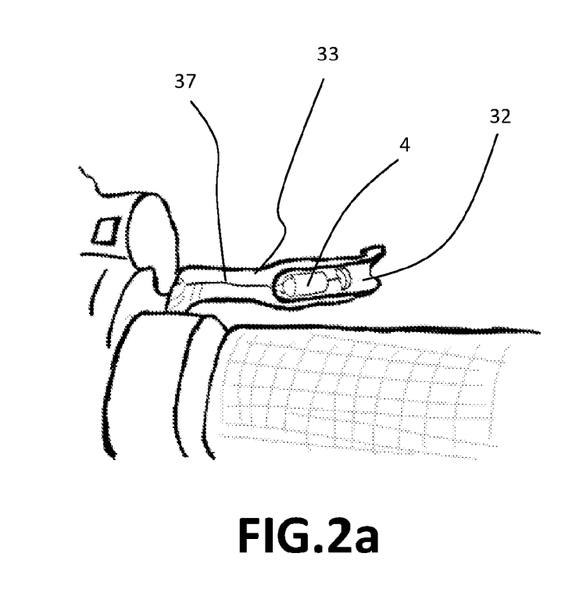
FIGS. 2a and 2b are two schematic illustrations of possible positions of an actuator of the system in a brake lever of the bicycle, a mountain bike and a racing bicycle respectively.
Figure 2B:
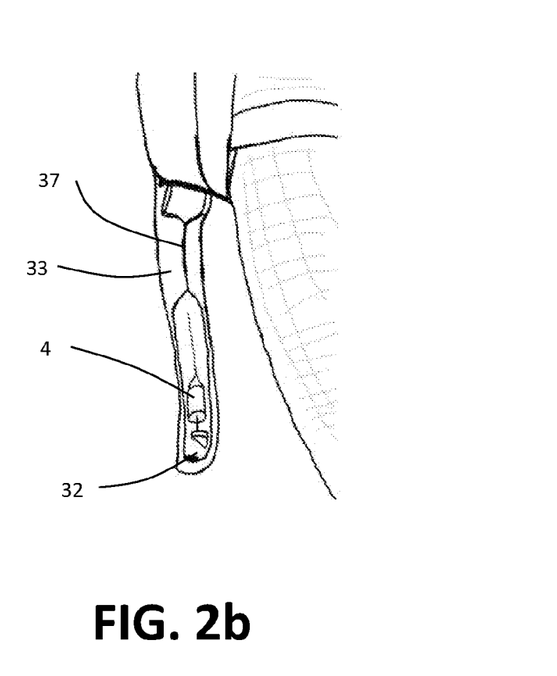

With references to FIGS. 2a and 2b, respectively illustrating a detail of the handlebar of a mountain bike or of a racing bicycle, the actuator 4 can for example be received inside a groove 32 typically present in the rear portion of the brake lever 33.

The actuator 4 can be placed in the groove 32 for example by a housing, not shown in the figures, configured to close the groove 32 for protecting the actuator 4 from the weather, besides preventing the cyclist hand from contacting the actuator 4 itself. The actuator 4 is made integral to the brake lever 33 by the housing. The actuator is supplied and controlled by electric wires 37.

Preferably, the actuator 4 is of a DC brushed type and can be voltage- or current-controlled.

A battery 23 is preferably associated to the actuator 4 for supplying and moving the latter.

The system 1 comprises a first sensor 2 for measuring the angular speed $\omega_1$ of the first wheel 101, particularly of the front wheel. The first sensor 2 is adapted to generate a signal representative of such angular speed of the first wheel. Such first sensor 2 can transmit the signal representative of the angular speed $\omega_1$ of the first wheel 101 either wirelessly or by wire.

According to a possible embodiment, the system 1 can further comprise a second sensor 3 for measuring the angular speed $\omega_2$ of the second wheel 102, particularly of the rear wheel. The second sensor 3 is adapted to generate a signal representing such angular speed of the second wheel. From the signal representing the angular speed $\omega_2$ of the second wheel 102, it is possible to determine the speed v of the bicycle, assuming the second wheel is not slipping, from the relationship $v=\omega_2 R_2$, wherein $R_2$ is the radius of the second wheel 102. Optionally, the bicycle speed v can be used by the system 1, according to the invention, as it will be explained in the following. Moreover, the bicycle speed, if is necessary, can be alternatively derived from other sensors, for example inertial sensors, so that the second sensor 3 for measuring the angular speed $\omega_2$ of the second wheel 102 can be omitted.

According to a possible embodiment, the system further comprises a module for determining the slope angle θ of the bicycle, in other words the road slope, and adapted to supply a signal representing the same. This can be calculated in different ways.

According to a possible embodiment, the module for determining the slope θ comprises a dedicated slope sensor adapted to supply a signal representing the same. Alternatively, the slope θ can be obtained from signals representing inertial magnitudes of the bicycle, for example according to what is described in: M. Corno, P. Spagnol, S. M. Savaresi S "Road Slope Estimation in Bicycles without Torque Measurements". For this purpose, the system 1 can comprise an inertial measuring unit 18 adapted to measure one or more among the longitudinal $a_x$, lateral $a_y$ and vertical accelerations $a_z$, and/or one or more among the roll $\omega_x$, yaw $\omega_y$, and pitch angular speeds $\omega_z$ of the bicycle, and adapted to generate signals representing the same. As it will be explained, the inertial measuring unit 18 can be advantageously further used for further operations of the system 1 according to the invention. Particularly, for example, the speed v of the bicycle can be calculated by integrating over time limited intervals the longitudinal acceleration $a_x$ supplied by the inertial measuring unit 18.

According to an embodiment, the system 1 comprises a sensor for detecting the braking action of a user, adapted to supply a signal representing the same. For example, such sensor can comprise a switch (not shown in the figures) coupled with the brake lever 33, capable of detecting when this is actuated by the cyclist. Alternatively, as it will be described, the braking can be detected also without such sensor, particularly by the signal from the speed sensor 2 of the first wheel 101.

According to a possible embodiment, the system 1 comprises a module for detecting a pedal-thrust input of the cyclist (not shown in the figures). For example, such module can comprise a pedal-thrust torque sensor mounted to the bicycle pedals, or a pedal-thrust speed sensor, mounted to the pedals or a free-wheel mechanism preferably placed at the rear wheel, wherein the chain unloads the driving torque applied by the cyclist to the wheel. Alternatively, the pedal-thrust input can be obtained from signals supplied by the angular speed sensor 2 of the first wheel 101 and/or by the inertial measuring unit 18 according to known estimate algorithms. For example, the pedal-thrust rate is possibly obtained from what is disclosed in the patent application WO 2017/089904 filed by the Applicant, the contents thereof being herein incorporated by reference.

The system 1 comprises a control module 5 adapted to generate a command signal to the actuator 4 so that this latter vibrates at a determined vibration frequency f. The command signal to the actuator can be determined based on signals from one or more of the system 1 sensors and based on one or more reference magnitudes.

Advantageously, the system further comprises a learning module 50 configured to determine and supply to the control module 5 said one or more reference magnitudes. The one or more reference magnitudes, as determined by the learning module 50, represent the skillfulness of a cyclist, and are determined based on signals from one or more of the system 1 sensors, according to what will be described in the following.

Referring to the attached figures, possible embodiments of the invention will be now described.

Figure 3:
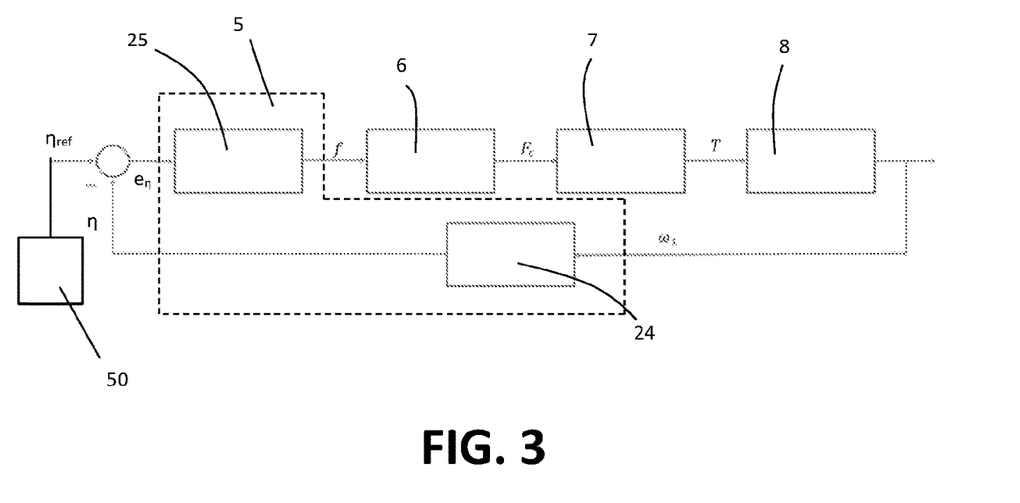
FIG. 3 is a block diagram of a brake assist system according to a possible embodiment of the invention.

For example, FIG. 3 shows the block 6 representing the cyclist, which acts with a determined force $F_c$ on the brake lever for actuating the first wheel brake. Consequently, the bicycle braking system, represented by block 7, transforms such force $F_c$ into a braking torque T on the first wheel. The block 8 represents the bicycle and takes into consideration the dynamics established by the tire and road, which can determine a slippage of the first wheel with respect to the road. This is due to several factors, among them the road conditions, tire conditions, road slope, bicycle roll angle.

The control module 5 comprises a module 24 for estimating the (linear) deceleration η of the first wheel. Specifically, the estimating module 24 is configured to determine the deceleration of the first wheel from the angular speed $\omega_1$ of the first wheel, by deriving it the angular deceleration and therefore the first wheel and consequently the linear deceleration of the first wheel $\dot{\omega}_1$ can be obtained based on the formula:

$$\eta = \dot{\omega}_1 R_1$$

wherein $R_1$ is the radius of the first wheel 101.

The control module 5 determines the vibration frequency f that the actuator 4 must have, based on a static map stored in a memory module 25 of the control module itself. Such memory module 25 can particularly receive, at the input, the error $e_\eta$ between a reference deceleration $\eta_{ref}$ and deceleration n of the first wheel determined as said before:

$$e_\eta = \eta_{ref} - \eta$$

Figure 4:
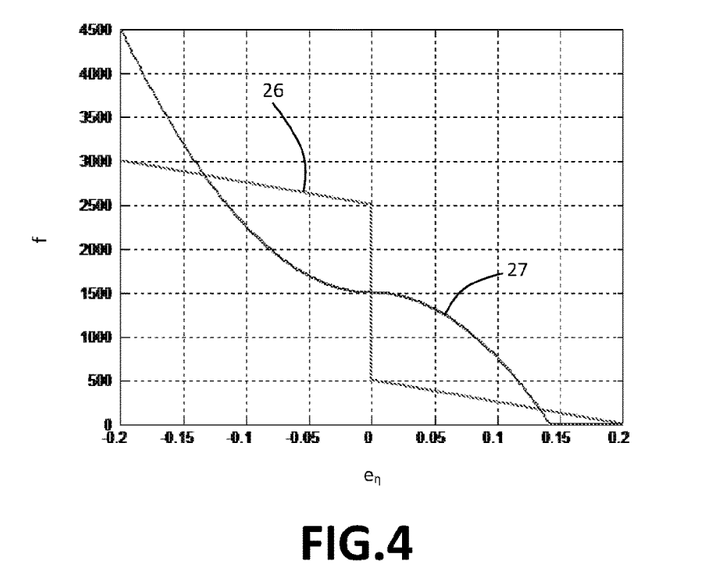
FIG. 4 is a diagram showing two possible curves of a vibration frequency versus a deceleration error of the first wheel of the bicycle.

FIG. 4 shows two possible curves establishing a relationship between the vibration frequency and the deceleration error $e_\eta$.

According to a first curve 26, a discontinuity is provided when the deceleration error $e_\eta$ is zero. According to a second curve 27, at a zero deceleration error $e_\eta$, the derivative is equal to zero. Consequently, the frequency f stays about constant and is subjected to minimal variations about such condition.

Figure 5:
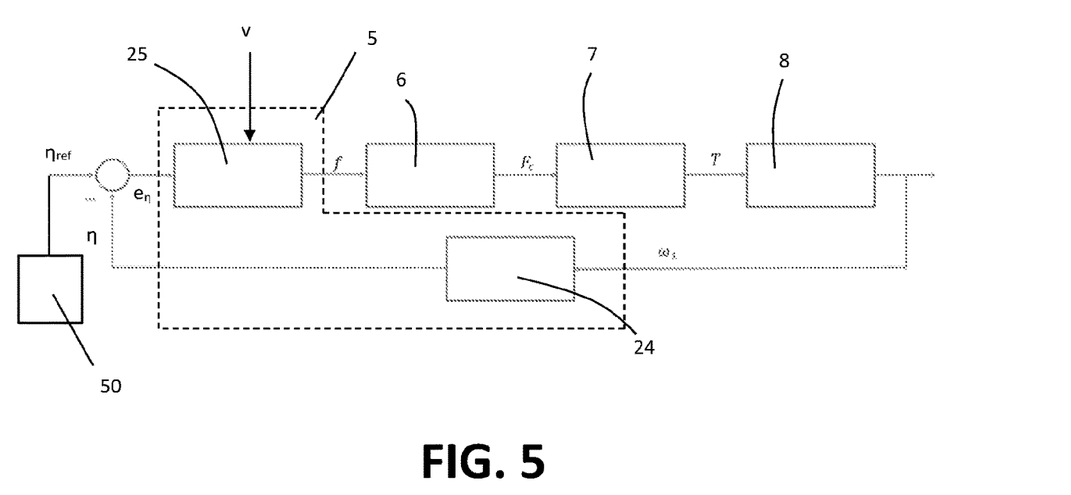
FIG. 5 is a block diagram of a brake assist system according to a further possible embodiment of the invention.

According to a further possible variant illustrated in FIG. 5, the vibration frequency f of the actuator is also affected by the effective speed v of the bicycle. Particularly, the frequency determined based on the static map of the memory module 25 is amplified by a factor kv, wherein k is a constant and v is the bicycle speed. This latter can be determined from the signal representing the longitudinal acceleration $a_x$, supplied by the inertial measuring unit 18, or from the signal representing the angular speed $\omega_2$ of the second wheel, if present. Therefore, the frequency f depends on the bicycle speed v, particularly is amplified as the bicycle speed v increases.

Referring to the hereinbefore described embodiments of the control module 5, the learning module 50 can be configured to supply to the control module the reference deceleration $\eta_{ref}$. Particularly, the learning module 50 determines and updates a cyclist profile as he/she uses the bicycle, and determines the reference deceleration $\eta_{ref}$ by also progressively updating it.

Figure 6:
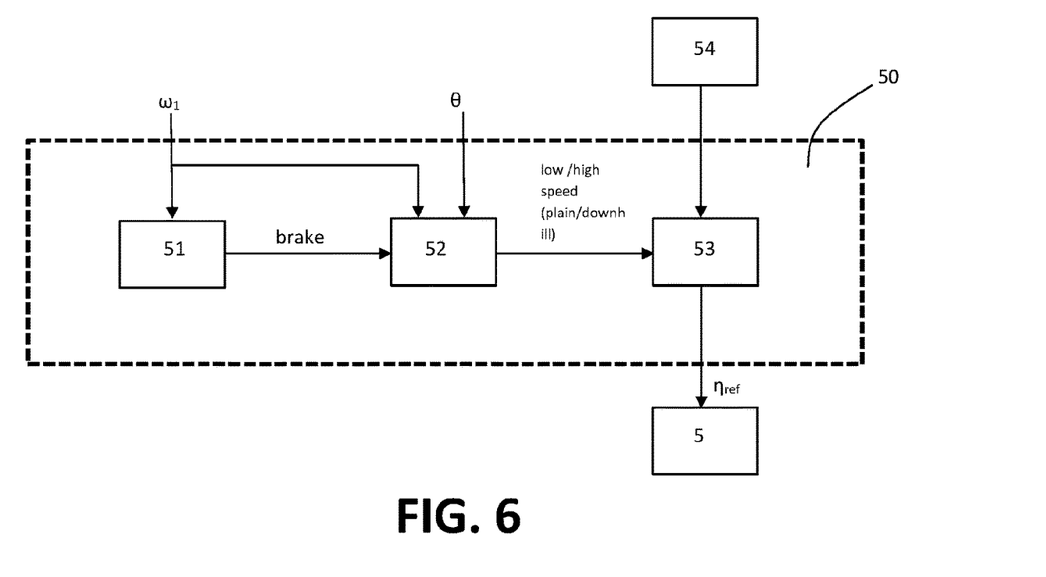
FIG. 6 is a block diagram of a learning module of the brake assist system according to a possible embodiment.

FIG. 6 shows a schematic representation of the learning module 50 according to a possible embodiment of the invention.

According to such embodiment, the learning module 50 comprises a braking detecting module 51 configured to detect when a cyclist is braking.

The module 51 can determine the occurrence of a braking if it receives, at the input, the signal from the previously cited braking sensor, if is present.

Figure 7:
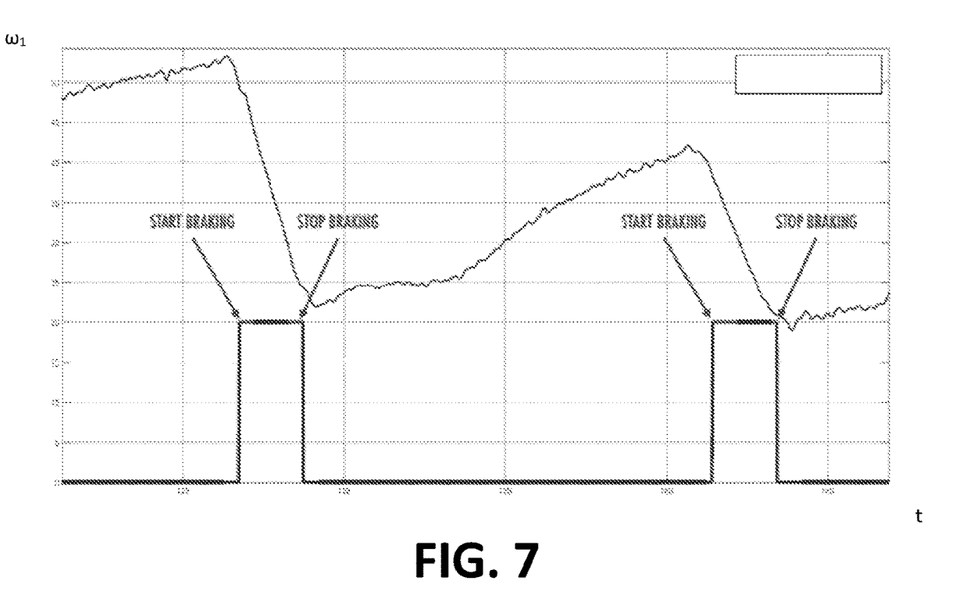
FIG. 7 is a diagram illustrating a possible trend of the speed of a bicycle wheel versus the time for determining a braking action on it.

If the braking sensor is omitted, it is possible to determine the occurrence of a braking, by the signal representing the angular speed $\omega_1$ of the first wheel. For example, FIG. 7 shows a possible trend during time t of such speed, wherein two abrupt reductions of the same are shown, having a start ("start braking") and a stop ("stop braking") corresponding to the breakings. The module 51 finds the brakings because it performs an analysis of the angular speed $\omega_1$ of the first wheel during time t. Particularly, the brakings are analytically detectable for example by analyzing the angular acceleration (obtainable by time deriving the angular speed $\omega_1$ of the first wheel) and the jerk (obtainable by time deriving the angular acceleration of the first wheel) of the first wheel. The angular acceleration of the first wheel will jump, while the angular jerk of the first wheel will show a peak during braking.

Referring again to FIG. 6, during braking, the module 51 generates a signal indicative of the presence of a braking ("brake").

Figure 8:
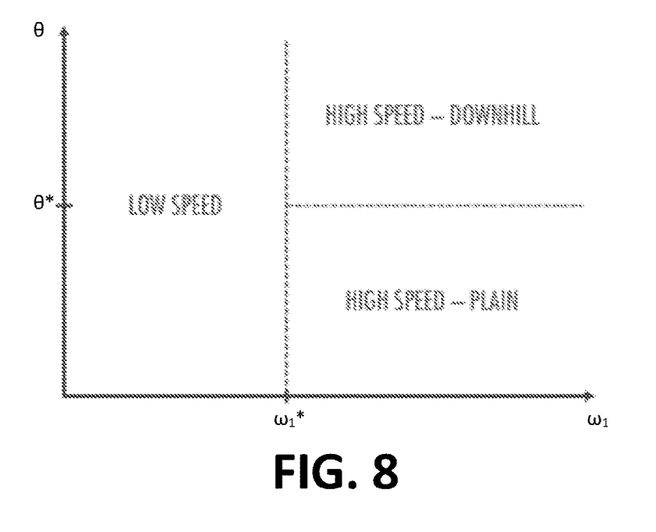
FIG. 8 is a diagram illustrating a possible classification of the brakings based on the angular speed of a bicycle wheel and slope.

Advantageously, the learning module 50 comprises a braking classifying module 52 configured to classify each braking event based on at least the signal representing the first wheel speed $\omega_1$, preferably further based on the signal representing the slope θ and to output, at each braking event detected by the braking detection module 51, one or more parameters representing such classification. Referring to FIG. 8, it shows a diagram of a possible braking classification. The abscissa represents the speed $\omega_1$ of the first wheel, and the ordinate the slope θ. The diagram shows three quadrants:

LOW SPEED
HIGH SPEED—DOWNHILL
HIGH SPEED—PLAIN

According to this example, it is provided a threshold speed $\omega_1^*$ separating the low speed from the high speed. Above the threshold speed $\omega_1^*$, the braking is determined as a downhill or plain braking based on a threshold slope, preferably equal to 0° (eventually±a constant). Generally, for example, a cyclist often braking at low speeds has a prudent behaviour, while a cyclist frequently braking at high speeds—perhaps mainly along downhills—and less at low speeds, has a more aggressive behaviour. The parameters representing the braking can include, for example, a more or less high score, based on the tendency of the cyclist to brake at high or low speeds, along downhill or on plain.

Of course, it is possible to classify the braking by modes different from the above described ones. For example, without the signal representing the slope, the classification can be only performed based on the angular speed of the first wheel.

According to a possible embodiment, the braking classifying module 52 is configured to further classify the braking based on the roll angle of the bicycle and/or based on the pedal-thrust input detected before braking. The bicycle roll angle can be obtained from the signal representing the roll angular speed $\omega_x$ supplied by the inertial measuring unit 18, while the pedal-thrust input can be detected by the beforehand cited module for detecting the pedal-thrust input (the torque or speed/pedal-thrust rate).

Referring again to FIG. 6, advantageously, the learning module 50 further comprises a module for optimizing the reference magnitudes 53, configured to receive at the input the parameters representing the braking classification, supplied by the module 52, and to generate a cyclist profile by a progressive update. Moreover, the module for optimizing the reference magnitudes 53, based on the progressively updated profile, determines the reference magnitudes supplied to the control module 5. With reference to the embodiments shown in FIGS. 3 and 5, the module for optimizing the reference magnitudes 53 can for example determine and update, during the cyclist run, the reference deceleration $\eta_{ref}$. Therefore, if the cyclist is classified as prudent, the reference deceleration $\eta_{ref}$ could assume a low value (in absolute value) while, if the cyclist is more aggressive, the reference deceleration could assume a higher value (in absolute value).

According to a possible embodiment, the module for optimizing the reference magnitudes 53 can further receive, at the input, in order to determine the reference magnitudes, one or more of the following information:

sex of the cyclist;
age of the cyclist;
type of the bicycle;
type of brakes;
positioning.

For example, it is possible to foresee a lower reference deceleration $\eta_{ref}$ for older cyclist. In addition, it is possible to obtain information from the positioning, such as for example: weather conditions, road surface conditions, etcetera. With reference to the positioning, the system 1 can for example comprise a GPS module for geopositioning the bicycle during the motion thereof.

It is observed that said information can be locally saved in a memory module of the system 1. Alternatively, the information can be stored in a remote system 54, for example in a cloud system. For this purpose, the system 1 can comprise a transmission module for supplying and receiving data to/from the remote system. According to a variant, the system 1 can be connected to a mobile device of the cyclist, for example a smartphone, storing a dedicated application. A hybrid system can be further provided in which some information are locally saved, and other information are remotely saved.

Even though the present description refers to the reference deceleration $\eta_{ref}$ as a reference magnitude which is updated by the learning module 50, it is observed that this latter can act also on reference magnitudes of different type.

Particularly, the control module 5 can be configured according to each of the embodiment variants described in the international patent application WO 2016/203331, the content thereof being integrally incorporated by reference.

So that, in a non-limiting illustrative way, referring also to the contents of the international patent application WO 2016/203331, the reference magnitudes which can be updated by the learning module 50, can include:

- static maps correlating input magnitudes (the effective slippage $\lambda$ of the first wheel, slippage error $e_\lambda$, parameter R representing the flipping-over risk, error $e_\eta$ between the reference deceleration $\eta_{ref}$ and effective deceleration n of the first wheel, effective deceleration $\eta$ of the first wheel, error $e_\varepsilon$ between a mixed magnitude of reference deceleration and slippage $\varepsilon_{ref}$ and a mixed magnitude of effective deceleration and slippage $\varepsilon$ of the first wheel, etcetera) to the vibration frequency f of the actuator;
- amplification constant k of the vibration frequency of the actuator, as defined by the static maps, as a function of the bicycle speed v;
- reference slippage $\lambda_{ref}$, reference slippage $\lambda^\phi_{ref}$ varying as a function of the roll angle $\phi$, a mixed magnitude of the reference deceleration and slippage $\varepsilon_{ref}$.

Controlling the Actuator 4

Once determined the vibration frequency f by the above described modes, it is necessary to control the actuator 4 itself so that this effectively vibrates at such vibration frequency.

Alternatively, the actuator 4 can be voltage- or current-controlled.

If the actuator 4 is voltage-controlled, it suffices to modify the supply voltage of the actuator, based on the determined vibration frequency. Therefore, according to such variant, the system 1 comprises a voltage-control module of the actuator (not shown in the figures) receiving, at the input, the command signal, and consequently supplying the actuator 4 with a voltage adapted to vibrate the actuator at the determined vibration frequency.

Figure 9:
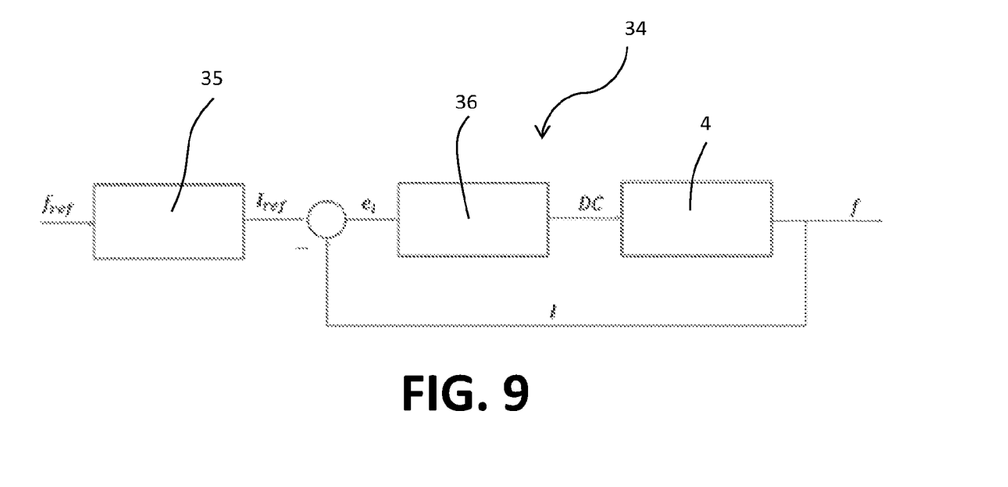
FIG. 9 is a block diagram of a current control module of the actuator of the system according to a possible embodiment of the invention.

According to a further variant, if the actuator 4 is current-controlled, the system 1 comprises a current-control module 34 of the actuator, schematically illustrated in FIG. 9.

According to this variant, the module 34 receives, at the input, the desired vibration frequency determined by the previously described modes, indicated in this case as a reference frequency $f_{ref}$.

Figure 10:
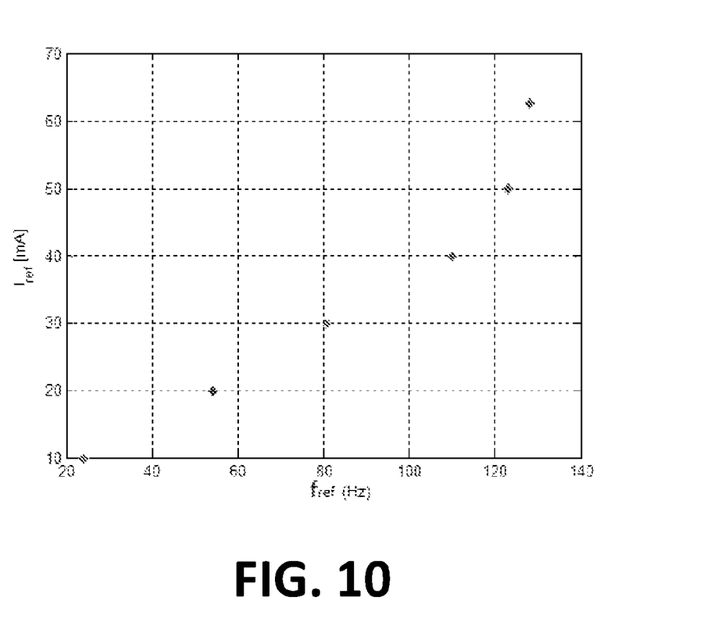
FIG. 10 is a diagram illustrating a possible relationship between a reference frequency and a reference current for a current-control of the actuator of the system according to a possible embodiment of the invention.

The module 34 comprises a memory module 35 storing a static map relating the reference vibration frequency $f_{ref}$ to a reference current $I_{ref}$. An example of such map is shown in FIG. 10. Therefore, a reference current $I_{ref}$ corresponding to the reference vibration frequency $f_{ref}$ is obtained at the output of the memory module 35.

Consequently, the module 34 performs a closed-loop control of the actuator current 4. For this purpose, the module 34 comprises a current sensor measuring the motor effective current I, from which a current error $e_I$ between the reference current $I_{ref}$ and effective current I is determined.

Moreover, the module 34 comprises a voltage command module 36 determining the DC (duty cycle) voltage to be applied across the actuator 4 so that the current error $e_I$ is minimized, in other words so that the effective current I substantially follows the trend of the reference current $I_{ref}$. Due to the current I set in this way, the actuator 4 will vibrate at an effective frequency f which follows the trend of the reference frequency $f_{ref}$.

Generally, such current-control method enables to have faster response times than the ones of the voltage-control, and further enables to prevent too high currents from flowing in the actuator 4.

It is observed that in the present description and in the attached claims, the system 1 and also the elements indicated by the term "module", can be implemented by hardware devices (control units, for example), by software or by a hardware and software combination.

A person skilled in the art in order to meet specific contingent needs, could add several additions, modifications, or substitutions of elements with other operationally equivalent ones, to the described embodiments of the adaptive brake assist system of a cyclist on a bicycle by an haptic feedback, without falling out the scope of the attached claims.

The invention claimed is:

1. Adaptive brake assist system for a cyclist on a bicycle by an haptic feedback, comprising:
   - a first sensor for measuring the angular speed of a first wheel of the bicycle, adapted to generate a signal representative of the angular speed of the first wheel;
   - an actuator mountable to a portion of the bicycle, adapted to generate vibrations;
   - a control module configured for generating a command signal of the actuator, so that the actuator vibrates with a vibration frequency, based on at least said signal representative of the angular speed of the first wheel and based on one or more reference magnitudes ($\eta_{ref}$); and
   - a learning module configured for determining, updating and delivering to the control module said one or more reference magnitudes ($\eta_{ref}$) based on at least the signal representative of the angular speed ($\omega_1$) of the first wheel, wherein the learning module comprises:
   - a module for sensing the braking configured for sensing when the cyclist is braking and for outputting a signal representative of the braking presence, and
   - a braking classifying module configured for classifying each braking event as sensed by the braking sensing module based on at least the signal representative of the angular speed of the first wheel ($\omega_1$), and for delivering one or more parameters representative of such classification of the braking.

2. System according to claim 1, further comprising a module for determining the slope angle ($\theta$) of the bicycle, adapted to deliver a signal representative of the same, wherein the learning module is configured for determining, updating and delivering to the control module said one or more reference magnitudes further based on the slope ($\theta$) of the bicycle.

3. System according to claim 1, further comprising an inertial measuring unit adapted to measure the longitudinal ($a_x$) and/or lateral ($a_y$) and/or vertical accelerations ($a_z$), and/or the roll ($\omega_x$) and/or pitch ($\omega_y$) and/or jaw ($\omega_z$) angular speeds of the bicycle, and to generate signals representative of the same.

4. System according to claim 2, wherein said module for determining the slope (θ) comprises a slope sensor adapted to deliver a signal representative of the same.

5. System according to claim 2, wherein said module for determining the slope (θ) is configured for determining said signal representative of the slope (θ) from the signals of the inertial measuring unit.

6. System according to claim 1, wherein said braking sensing module comprises a sensor for sensing the braking action by a user, adapted to deliver a signal representative of the same.

7. System according to claim 1, wherein said braking sensing module is configured for sensing when the cyclist is braking based on said signal representative of the angular speed of the first wheel.

8. System according to claim 2, wherein said braking classifying module is configured for classifying each braking event as sensed by the braking sensing module and for delivering said one or more parameters representative of such classification of the braking further based on the signal representative of the slope (θ).

9. System according to claim 3, wherein said braking classifying module is configured for classifying each braking event as sensed by the braking sensing module and for delivering said one or more parameters representative of such classification of the braking further based on the roll angle of the bicycle as determined from the signal representative of the roll angular speed ($\omega_x$) sensed before braking.

10. System according to claim 1, further comprising a module for detecting a pedal-thrust input from a cyclist, adapted to deliver a signal representative of the same, wherein said braking classifying module is configured for classifying each braking event as sensed by the braking sensing module and for delivering said one or more parameters representative of such classification of the braking further based on the signal representative of the pedal-thrust input from the cyclist, sensed before braking.

11. System according to claim 1 wherein the learning module further comprises a module for optimizing reference magnitudes, configured for:
    generating a cyclist profile, by progressively updating it, based on one or more parameters representative of the classification of the braking; and
    determining said one or more reference magnitudes ($\eta_{ref}$) based on the cyclist profile.

12. System according to claim 11, wherein said reference magnitudes optimizing module is configured for generating the cyclist profile further based on the sex of the cyclist and/or age of the cyclist and/or the type of bicycle and/or the type of brakes and/or based on the location.

13. System according to claim 1 wherein said first wheel is a front wheel of the bicycle.

14. Bicycle comprising a first and second wheels, a brake lever for braking one of said first and second wheels, and an adaptive brake assist system according to claim 1.

* * * * *